Figure 1:
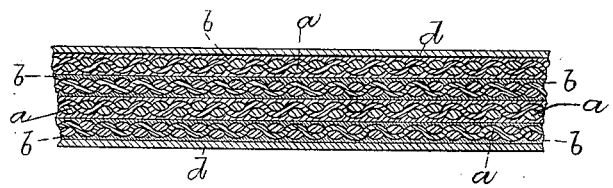

(No Model.)

J. J. HALEY.
MANUFACTURE OF BELTING.

No. 271,629.          Patented Feb. 6, 1883.

Witnesses.
G. B. Maynadier
John R. Snow.

Inventor.
John J. Haley
by J. E. Maynadier
his atty

UNITED STATES PATENT OFFICE.

JOHN J. HALEY, OF NEWTON, MASSACHUSETTS.

MANUFACTURE OF BELTING.

SPECIFICATION forming part of Letters Patent No. 271,629, dated February 6, 1883.

Application filed August 30, 1882. (No model.)

*To all whom it may concern:*

Be it known that I, JOHN J. HALEY, of Newton, in the county of Middlesex and State of Massachusetts, have invented certain Improvements in the Art or Process of Manufacturing Belting, of which the following is a specification, reference being had to the accompanying drawing, making a part hereof.

Belting made up of one or more thicknesses of duck coated with vulcanized rubber, commonly called "rubber belting," has long been in the market. At first rubber belting was put on the market without being subjected to any stretching operation; but for many years appliances for taking out the stretch by subjecting the vulcanized belting to a heavy strain have been in general use in belting-factories.

I have discovered that the stretching process materially injures the rubber belting by altering the relation of the threads of the duck to the vulcanized rubber in which they are embedded, and also by the elongation of the rubber portions of the belt, for when a rubber belt is stretched after it is completely formed, and either wholly or partially vulcanized, the rubber is so little plastic, even when heated, that the motion of the threads of the duck, necessarily incident to the elongation of the belt, impairs the adhesion of the rubber to the threads, and also weakens the cohesion of the rubber particles to each other. Moreover, it is practically impossible to take out all the stretch which should be taken out without tearing or otherwise visibly damaging the belt. My invention is based upon this discovery; and it consists in subjecting a rubber belt, made up in the usual way, to the stretching process while the rubber compound is green and plastic—that is, before it has been vulcanized. By "rubber compound" I mean the pure rubber and other ingredients usually used mixed and ground into a plastic mass. When stretched green the belt can be readily elongated enough to take out all the stretch, which is practically impossible when the belt is stretched after the rubber compound has been vulcanized. Moreover, the motion of the threads of the fibrous material of the belt, caused by elongating the belt when green, tends to make them take a more intimate and closer hold upon the plastic rubber compound by which they are surrounded, and as the rubber compound is plastic it is not injuriously affected by elongating it, and when vulcanized is in precisely the same condition as the vulcanized rubber in the old belts before they were subjected to the stretching operation.

A belt made by my improved process when finished is practically free from stretch, not yielding in use to any objectionable extent, one of such belts when first put to use being as free from stretch as one of the old kind after months of constant use, but differing from the old kind in that the rubber portion of such belt is substantially the same as the rubber portion of the old kind before it was subjected to the stretching process.

In the drawing, the figure represents a cross-section, greatly enlarged for clearness, of a piece of four-ply rubber belting, $a$ representing the threads of the duck; $b$, the rubber compound, commonly called the "friction-coat;" and $d$, the outer covering of rubber.

The manner of applying the friction-coat $b$ and the outer covering, $d$, and of making up the belt are too well known to require description; but I prefer to make up the belt complete, except the outer coating, $d$, and then to elongate it with the usual apparatus, and either warm or cold, and afterward to apply the outer covering, $d$, and when so prepared to vulcanize and finish it in the usual way, except, of course, that it need not be again stretched, the stretch having already been taken out, although it shortens a trifle in vulcanizing. In order to insure perfect adhesion of the outer covering of rubber, it is well to friction-coat both surfaces of the belt after stretching it, and to put one or two coats of rubber cement on the edges before applying the outer covering.

What I claim as my invention is—

That improvement in the art of making belting which consists in first coating the woven fabric with rubber compound, then making up the coated fabric in the usual way, then taking out the stretch, and then vulcanizing, as and for the purposes set forth.

JOHN J. HALEY.

Witnesses:
J. E. MAYNADIER,
J. R. SNOW.